Figure 1:
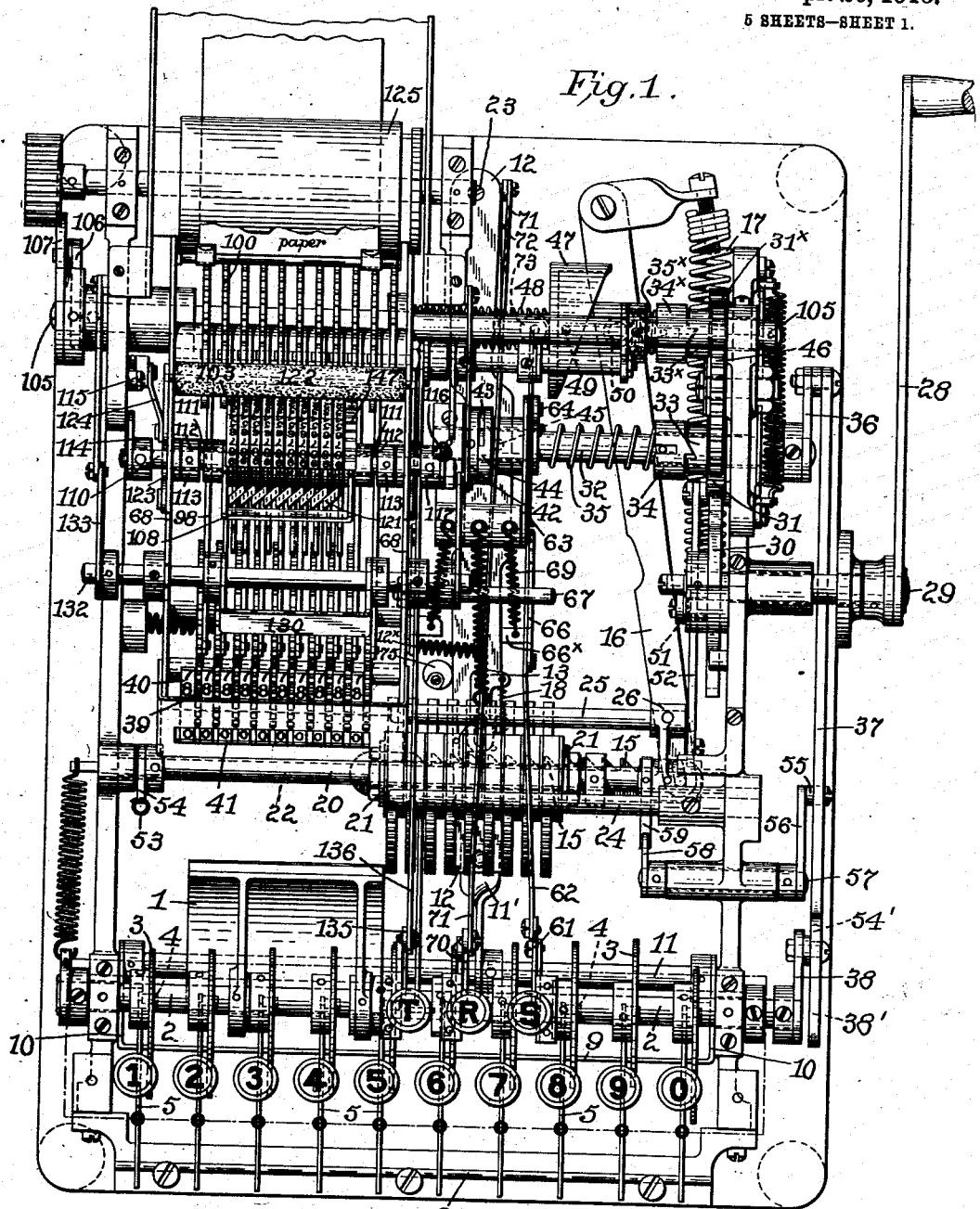

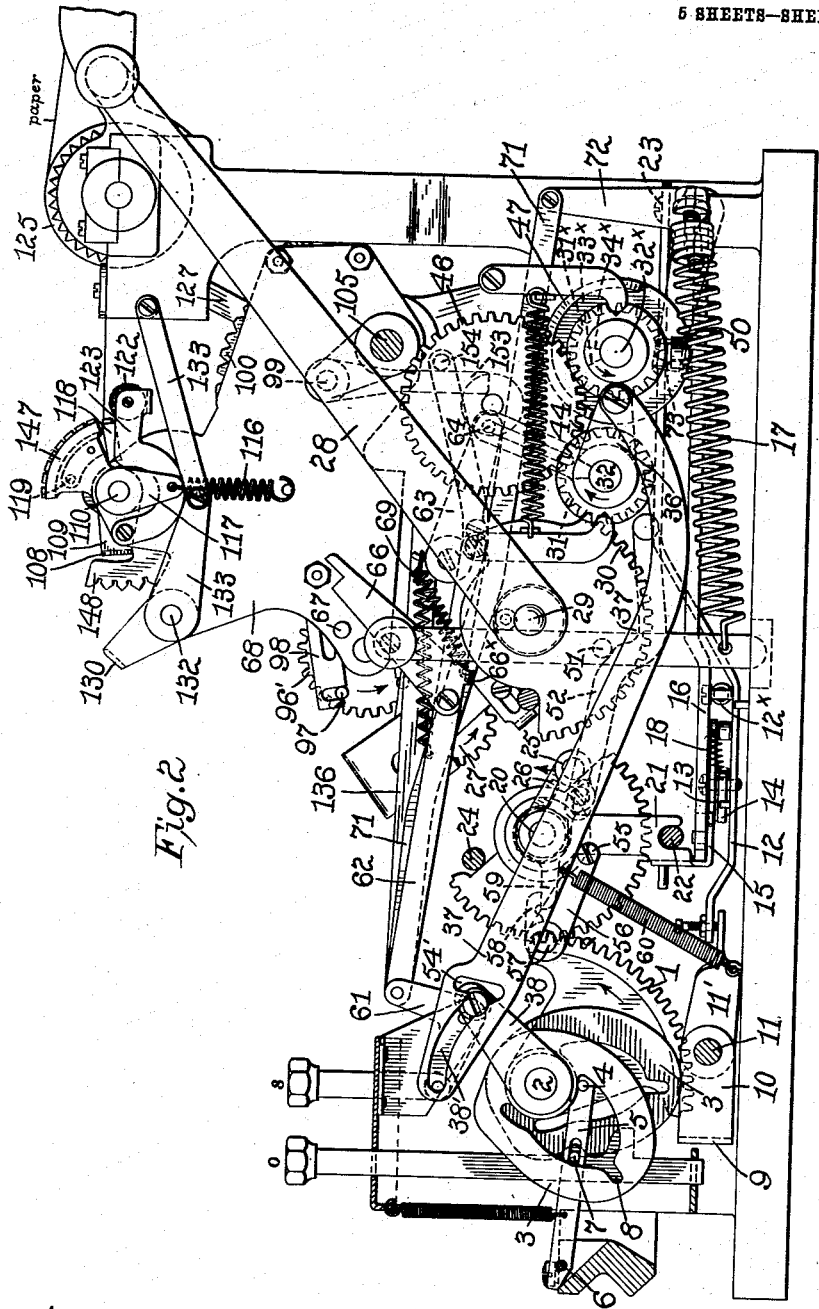

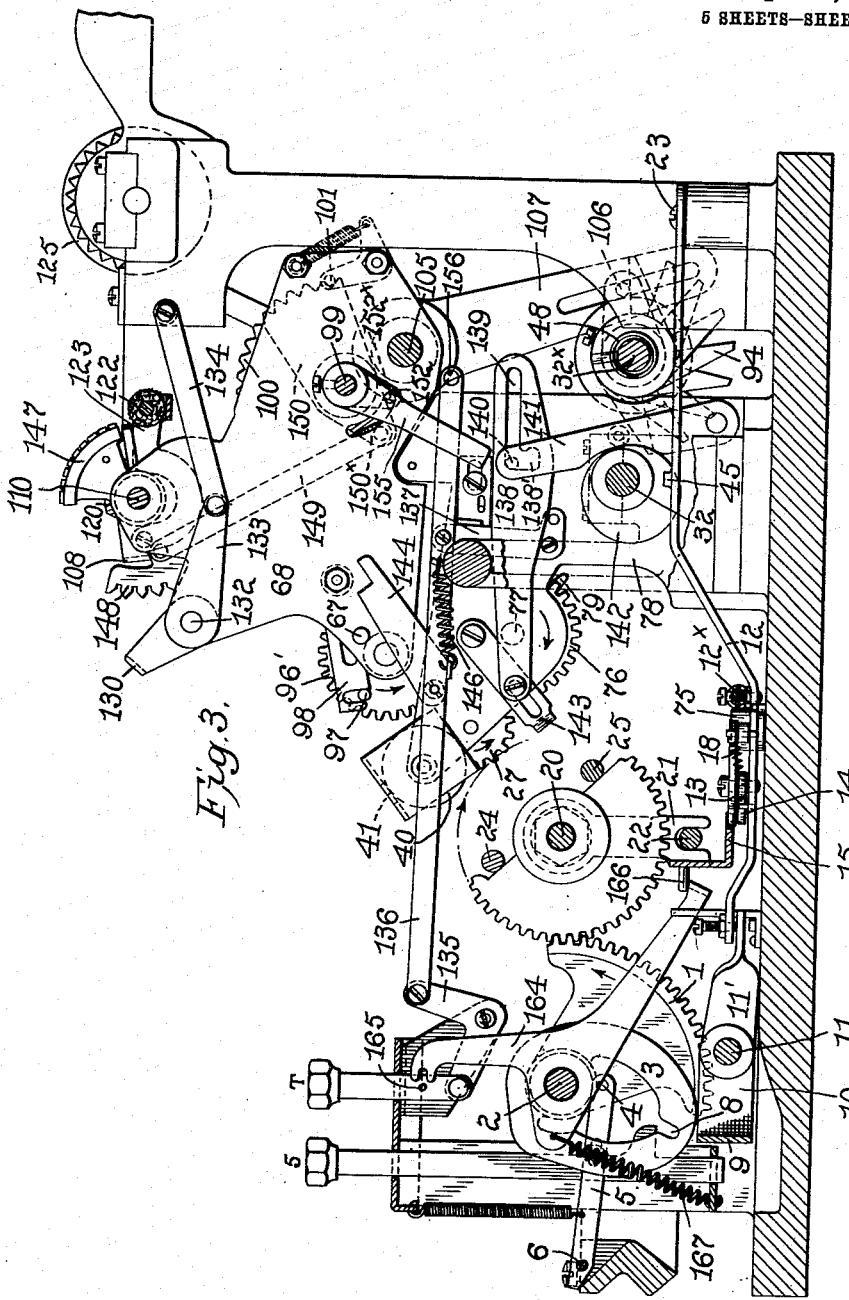

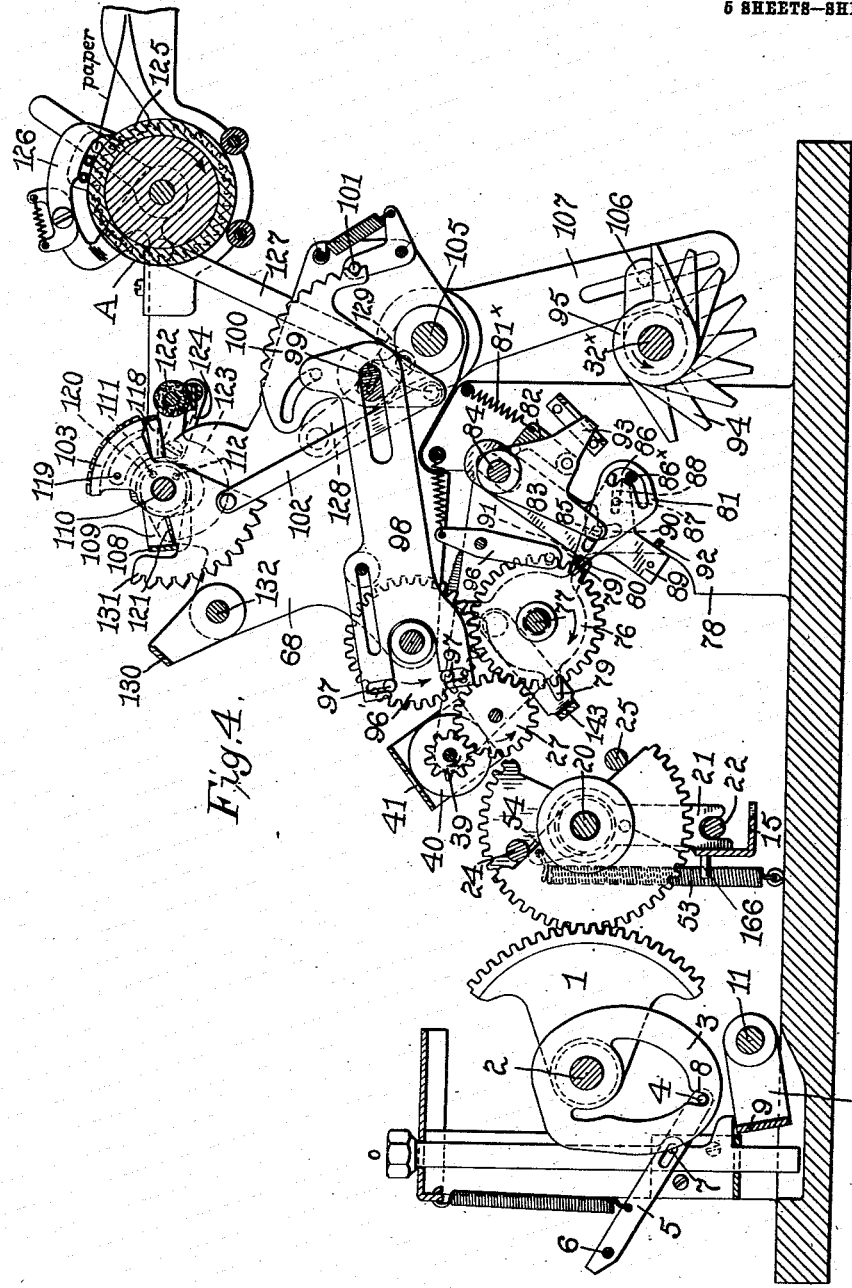

S. B. AUSTIN.
CALCULATING MACHINE.
APPLICATION FILED AUG. 28, 1911.
1,136,391.
Patented Apr. 20, 1915.
5 SHEETS—SHEET 5.
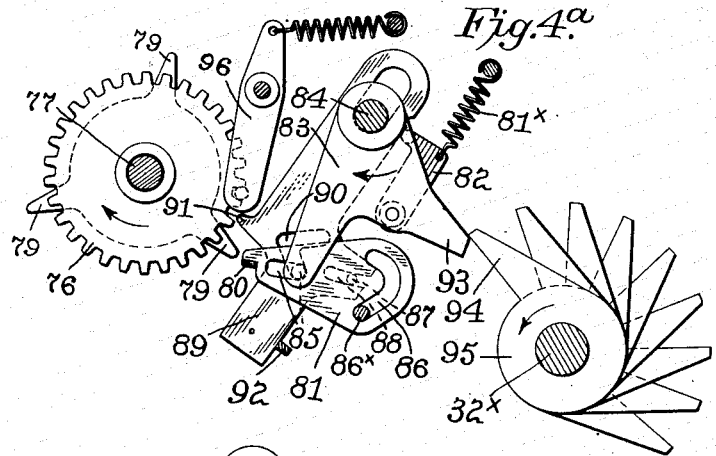
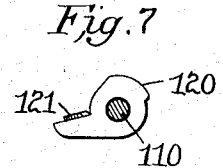
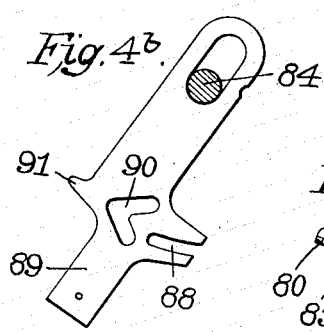
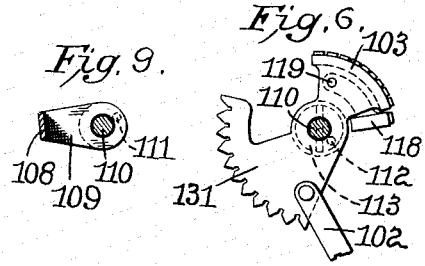
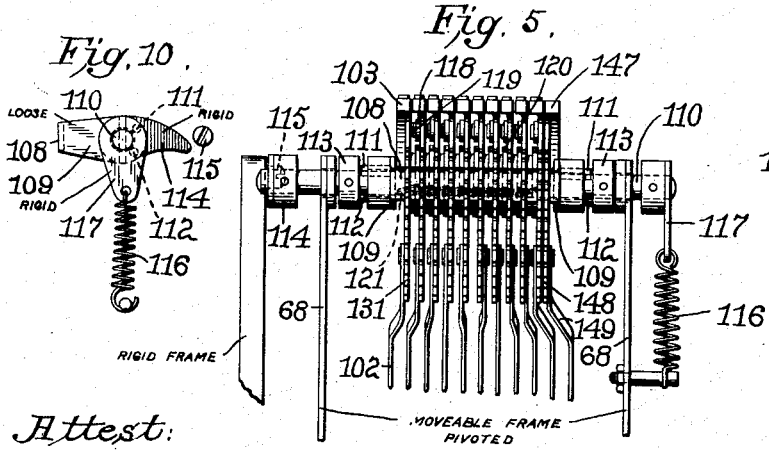
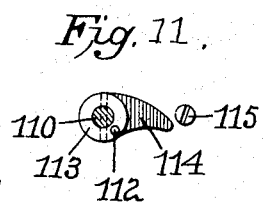
Attest:
Ewd L. Tolson
Inventor:
Sydney B. Austin
Attys.

UNITED STATES PATENT OFFICE.

SYDNEY B. AUSTIN, OF SUDBROOK PARK, MARYLAND, ASSIGNOR, BY MESNE ASSIGNMENTS, TO FREDERIC L. HUIDEKOPER, TRUSTEE, OF WASHINGTON, DISTRICT OF COLUMBIA.

CALCULATING-MACHINE.

1,136,391.  Specification of Letters Patent.  Patented Apr. 20, 1915.

Application filed August 28, 1911. Serial No. 646,507.

*To all whom it may concern:*

Be it known that I, SYDNEY B. AUSTIN, citizen of the United States, residing at Sudbrook Park, Maryland, have invented certain new and useful Improvements in Calculating-Machines, of which the following is a specification.

My present invention relates to the general form of adding, substracting and multiplying machine disclosed in an application for Letters Patent of the United States filed by me March 31, 1910, #552,736.

My present invention involves improvements throughout the said machine, and also printing mechanism which is operated by the movement of the actuating handle disclosed in the said application, totalizer mechanism, means for printing signs, as the minus and total signs, and the invention consists in the features of construction and combination and arrangement of parts hereinafter described and particularly pointed out in the appended claims.

Figure 1 is a plan view; Fig. 2 is a side elevation with parts in section; Fig. 3 is a view looking from the right of Fig. 1, substantially along the plane of the lever 12, the parts being shown in section; Fig. 4 is a view from front to rear through the selector and totalizing carrying and printing mechanism, with parts in section; Fig. 4ª is a view of the carrying mechanism of Fig. 4 with the parts in a different position therefrom; Fig. 4ᵇ is a view of the carrying pawl; Fig. 4ᶜ is a side view of the adjusting arm of the link; Fig. 5 is a front view of the printing mechanism; Fig. 6 is a view of the type carrier; Fig. 7 is a side view of one of the cams of the printing mechanism; Fig. 8 is a perspective view of the cam of Fig. 7; Fig. 9 is a view of the return bar; and Fig. 10 is a view of the return bar with means for operating the same. Fig. 11 is a view of a detail.

A selector 1 is used having teeth elongated parallel with its axis, and this selector is fixed to a shaft 2 journaled in the frame and having fixed thereon a series of cams 3 in positions to correspond to the values of the keys, these cams being in the form of open frames against the inner edges of which the pins 4 engage, said pins being on levers 5 pivoted at 6 to the frame, and having pin and slot connection at 7 to the key stems. When a key is depressed, the pin 4 will operate the cam and turn the selector shaft 2, the pin, in its final movement, engaging a locking notch 8 in the cam to prevent overthrow of the selector. The selector will therefore be turned to a position corresponding to the value of the operated key, and as the key stem completes its downward movement, it will depress the universal space bar 9 which is carried by arms 10 fixed to a shaft 11 journaled in the frame, which shaft has fixed thereto an arm 11', and the latter, upon lifting, will raise an escapement lever 12 to lift its upper sliding pawl 13 out of the tooth in the rack 15, and its lower pivoted pawl 14 into engagement with the rack tooth, so that the rack, under the action of pivoted lever 16 and spring 17, will move one step, or, in other words, the distance allowed by the movement of the pivoted pawl, which is the space of one rack tooth. The sliding and pivoted pawls are under tension of a spring 18.

The rack having its teeth facing horizontally, forms part of a carrier for the transmitting segments which are loosely mounted on a shaft 20 journaled in the frame of the machine, the said segments normally lying as a group to the right of the toothed selector. This group of transmitting gears is moved along the shaft by the step by step movement of the carrier, which includes the standards 21 connected with the rack and embracing the group of segments, the upper ends of the standards being slidable on the shaft 20, while their lower ends are guided on the rod 22 fixed in the frame.

The escapement lever 12, while being pivotally mounted at 23 to swing in a horizontal plane, for a purpose hereinafter described, is of sufficient length to be lifted by springing it up in order to accomplish the escapement action for feeding the carriage of the transmitting segments, this lifting being done by the arm 11' above described.

The selector having been turned by depressing a key to a position corresponding to the value of the key struck, the further downward movement of the key will operate the escapement and cause the group of transmitting segments to move one step leftward, so that the left hand segment will be thrown into engagement with the teeth of the selector, and when the next key is depressed—and supposing this to be a different key from that first operated—the selector will be turned to a different angular position from that first mentioned and the escapement will be again operated to cause the group of transmitting segments to move another step to the left, thus shifting the segment which has already engaged further along the selector and bringing the second transmitting segment into engagement with the longitudinal teeth or ribs on the selector. When the transmitting segments are in their released position of rest at the right of the selector, they are held in alinement with each other or in angular proper position by a stop bar 24 fixed in the frame and by a movable alining or return bar 25 carried by an arm 26 fixed on the shaft 20, to be operated as will be hereinafter described. The transmitting segments engage these bars at each side of the shaft, and they are thus held against rotary displacement and are in position to engage the longitudinal teeth of the selector when the group of segments is shifted leftward step by step. Those transmitting gears which have engaged the selector are now free to be rotated when the selector is rotated, having shifted axially from control of the stop bar 24 and alining bar 25. The desired number of keys having been operated and segments engaged, the next action is to transfer the values of these keys onto the totalizer wheels 27 by operating a hand lever 28 on a shaft 29 journaled in the frame, and having a segmental gear 30 meshing with a gear 31 loose on a shaft 32 mounted in the frame, but connected thereto by a clutch, one jaw 33 of which is carried by the gear 31 and the other jaw 34 of which is splined to the shaft and is pressed by a spring 35. As the handle 28 is pulled forward, the shaft 32 is rotated backward in the direction of the arrow, Fig. 2, and a crank arm 36 thereon, through a link 37, operates to turn the arm 38 on the selector shaft so as to turn the selector upwardly in the direction of the arrow, Fig. 2, and turn the engaged transmitting segments rearwardly into mesh with the wheels 27 of the totalizer, thus turning these, and as these are meshed with gears 39 connected with the register disks 40, these latter will be turned to bring the proper number to view through the sight opening at 41. As the handle is pulled farther forward, a cam 42 fixed on the shaft 32 brings its lateral high part 43 around to press laterally a collar 44 slidable on said shaft, the flange of which engages a pin 45 on the escapement lever so that the lever will be swung to the right, Fig. 1, and move the transmitting gear carriage to make the gears thereon aline with the spaces between the wheels of the totalizer, this action taking place after the said gears, in their backward rotation, have transferred their values onto the totalizer, and then as the handle is completing its forward stroke, the crank arm 36, with its link 37, will be returned to their normal position, and the selector will be returned to its normal position, thereby returning the transmitting gears by a forward rotating movement away from the totalizer and ready to be shifted axially to the right, Fig. 1, to their normal position of rest, disengaged from both the totalizer mechanism and the selector. It will be understood, therefore, that during the forward movement of the handle, the crank arm 36 will make one complete revolution owing to the gearing employed between the handle and the crank carrying shaft, and thus the selector, with the engaged transmitting members or segments, will make a rotary movement in one direction to transfer the values, and then a reverse movement, but that before this reverse movement takes place the axial shifting of the group of transmitting gears will take place to disengage from the totalizer wheels, so that, on this reverse movement, the totalizer wheels will be left in the positions to which they have just been moved. The transmitting gears having been disengaged from the totalizer wheels and then rotated forwardly by the forward movement of the handle as just described, and occupying different angular positions because they still remain in engagement with the selector, are now to be shifted to their disengaged position at the right of the selector, and then rotated back to normal position, or, in other words, alined up with all the other transmitting members of the group. These actions take place during the rearward movement of the handle back to normal position, and for these actions I employ a second shaft $32^x$ mounted in the frame, and rotated forwardly a complete revolution for each backward movement of the handle.

The shaft $32^x$ has a clutch jaw $34^x$ splined thereon and pressed by a spring $35^x$ to engage a clutch jaw $33^x$ on the gear $31^x$ loose on the shaft $32^x$, and which is rotated through a gear 46 turning on a stud mounted in the frame, and which derives its motion from the gear 31. This second or rear shaft has a cam 47 splined thereon and pressed longitudinally of the shaft by a spring 48, up against a pin 49 on the shaft $32^x$, said cam being normally backed up and held against this pin by a roller 73 hereinafter referred to. Now, as the handle is moved back, the cam on the rear shaft $32^x$ rotates forwardly through the clutch connection so that its side face or edge will engage the roller 50 on the return lever 16 connected to the carriage of the transmitting gear or segments, and during the backward movement of the hand lever, but before said movement is completed, the transmitting gear carriage will be returned to the right to occupy the position shown in Fig. 1.

During the final part of the backward movement of the handle, those transmitting gears which have been displaced circumferentially and forwardly during the selecting action will be rotated back to normal position in alinement with the other gears of the group by the alining or returning bar 25, and this is done by a pin 51 on the gear segment 30, depressing a lever 52 pivoted on the frame and connected pivotally to the arm 26 on the transmitting gear shaft, the said shaft with the arm being thus rotated to cause the alining bar to revolve part way around the shaft and thus engage with the angularly displaced transmitting gear segments and turn them about the shaft until the other sides of these segments strike the stop bar 24, when the transmitting segments will be properly alined to engage the selector when shifted axially to the left after the selector has been turned and locked by the notch 8 before mentioned.

The position shown in Fig. 2 is the extreme backward one of the alining bar. When the handle is drawn forward this alining bar will also rotate forwardly in the arrow direction from its backward limit, this being due to a spring 53 connected through an arm 54 with the transmitting segment shaft, which turns the shaft as soon as the pin 51 on the gear 30 begins to leave the lever 52. By this the alining bar is positioned far enough forward to engage and return any of the transmitting segments on the backward movement of the handle.

It will be observed that normally the selector is free to be rotated in either direction because the pin of the crank arm 38 is free to move in the curved slot 38' of the link 37. This slot terminates in a locking notch 54'. So long as the link is held up in the position shown in Fig. 2 the selector is free to be moved under the action of the keys, and for holding the link in this disengaged position, a pin 55 engages the under side of the link, said pin being carried by an arm 56 on a shaft 57 journaled in the frame and having a short arm 58 engaged by an arm 59 fixed on the transmitting gear shaft.

When the handle is back, this lifting lever raises the link 37 so that the selector is free to be moved, the pin on the crank arm 38 moving freely in the slot of the link, but when the handle 28 is moved forward, the turning of the transmitting gear shaft through the described connections, i. e., pin 51, lever 52 and arm 26, will depress the lifting lever, allowing a spring 60 to pull the link down and lock it to the crank pin as soon as the movement of the link causes the notch 54' to aline with the pin, and then the further movement of the handle forwardly moves the selector upwardly and then downwardly, the link, as before stated, making one complete movement, i. e., forward and back again to normal position during one stroke of the handle, i. e. the forward stroke. It may be here explained that during the backward stroke of the handle the selector and the transmitting gears have no rotary movement imparted thereto through the link, as the front shaft 32 has no movement imparted thereto during the rearward movement of the handle owing to the clutch jaw 33 slipping on the jaw 34 on this movement. In other words, during the forward movement of the handle, the front shaft 32 rotates forwardly and is at rest during the rear stroke of the handle, while as regards the rear shaft 32$^x$, this has no rotation during the forward stroke of the handle, but only a forward movement during the rear stroke of the handle.

*Subtracting.*—For subtracting, a key marked S is pressed down, operating through a bell crank lever 61, Fig. 2 a link 62, an arm 63 pivoted to the frame, and a pin and slot connection at 64 of the collar 44 before described to turn said collar so that its high part will be shifted circumferentially in relation to the high part of the cam 42, which causes the axial shifting of the transmitting gears to aline with the spaces between the wheels of the totalizer, so that this axial shifting, instead of taking place after the transmitting gears have engaged and moved the totalizer wheels, will take place before this engagement occurs. In this way the transmitting gears when rotated backward to transfer the values onto the totalizer wheels, will first enter the spaces between these wheels, and then the high part of the cam, by passing by the high part of the collar, will allow the spring 35 to shift the collar 44 to the left to permit the escapement lever 12 to move leftward also under the action of its spring 12$^x$, and cause the transmitting gears to engage the totalizer wheels with the result that as the transmitting wheels are rotated forwardly due to downward movement of the selector, the totalizer wheels will be turned the reverse way from that for addition, and hence subtraction will be performed.

When the subtraction key is operated, it is locked down by a detent 66 pivoted on the link 62 engaging a pin 67 on the printing frame 68. This holds the collar 44 in position for subtracting while the hand lever is being operated. When the printing frame is swung upwardly and rearwardly, as will be hereinafter described, to record the number set up, this movement will remove the pin 67 from the detent and allow a spring 69 to return the subtracting key and connections to normal position, and this spring being connected with the short arm of the detent 66, will hold this yieldingly in position, the said short arm 66ˣ acting as a stop to position the detent. The detent is made yielding so that as it moves forward, it will snap into engagement with the pin 67.

*Multiplying.*—For multiplying, a repeat key marked R is pressed down operating a bell crank lever 70, which, through a link 71, operates a lever 72 pivoted to the frame carrying a backing roller 73 which, when the repeat key is depressed, is thrown down from contact with the back face of the carriage return cam 47 of the transmitting gear carriage, so that when the handle is operated to transfer the values to the totalizer, the said roller will no longer back up the cam for its effective action in returning the carriage by acting on the roller 50 of the carriage return lever, but, on the contrary, the cam will be free to yield because backed up only by the spring 48, so that instead of the cam operating the return lever, the resistance offered thereby will cause the cam to move axially along its shaft as it is turned, and thus repeated transfer actions of the same values may be effected one for each operation of the handle, thereby performing multiplication as long as the backing roller is down out of service due to holding down the repeat or multiplying key R. The backing-up lever 72 is in turn backed up by bearing upon the side of the escapement lever 12. This lever 12 is itself backed up, or limited as to its leftward movement by bearing against an adjustable stop 75. This arrangement of lever 72 is for the purpose of holding the escapement lever 12 against the stop 75 against any undue movement to the right when the carriage return lever is moved to the right by the cam 47.

*Carrying mechanism.*—This comprises carrying wheels 76 loosely mounted on a shaft 77 mounted in the fixed frame plates or standards 78, and having carrying projections 79, said wheels meshing with the totalizer wheels 27. When carrying is to be done from one order to the next higher, the rotation of the carrying wheel of the low denomination in passing from 9 to 0 in addition or from 0 to 9 in subtraction will cause one of the projections 79 to strike a projection 80 on the adjusting arm or link 81 and shift said link 81 from the position of Fig. 4, which is radial in respect to the carrying wheel, into an inclined position shown in Fig. 4ᵃ this action being aided by the spring 81ˣ connected at one end to the frame and at its other end to an arm 82 pivoted to the setting plate 83 which is pivoted to the frame at 84, said setting plate having a pin and slot connection 85 with the adjusting link, said link having a substantially V-shaped slot 86 engaging a pin at 86ˣ, which pin is fixed in the frame. The said adjusting arm or link has a pin 87 working in a slot or fork 88 of the carrying pawl 89, which is slidably and pivotally mounted on the pivot pin 84 of the setting plate 83, said pawl having also a ∧ shaped slot 90 engaged by the pin at 85. The pawl has a tooth 91 to engage the carrying wheel of the next denomination, it being understood that there are a series of these mechanisms just described, and the pawl of one set is operated by the projections of the carrying wheel of the next lower denomination. The forward ends of these pawls rest and slide upon stops 92, one for each pawl.

Normally the parts lie in the position shown in Fig. 4. When, now, the projection 79 of the carrying wheel strikes the projection 80 on the adjusting link, this is tipped laterally, so that the force of the spring 81ˣ exerted through the pivoted setting plate and the pin and slot connection will move the adjusting link into the position shown in Fig. 4ᵃ. In this action, the adjusting link, by reason of the slot 85, will be allowed to drop away from the carrying projection to effect a considerable clearing movement in respect thereto, and because of this the projection 80 may be made large and strong to stand the wear, and yet, when operated, it will clear itself completely from the carrying projection on the carrying wheel. The movement of the adjusting link or arm just described permits two actions to take place simultaneously with said adjustment, and with each other, one being the setting of the setting plate 83 under the force of the spring 81ˣ from the position of Fig. 4 to that shown in Fig. 4ᵃ, in the former of which its tail 93 is not in the path of rotation of the arms 94 on the rear shaft 32ˣ, and in the latter of which said tail piece is in said path to be operated by said arms when the shaft 32ˣ and the carrying arm thereon are rotated in the arrow direction, Fig. 4. The other action effected by the adjustment of the link or arm 81 aided by the spring 81ˣ is the setting of the carrying pawl 89 from its neutral position of Fig. 4 to its "ready" position of Fig. 4ᵃ in which it has been shifted longitudinally into position ready to engage the next tooth in the carrying wheel. This action is started by the pin 87 on the adjusting link acting in the slot of the pawl and completed by the pin at 85 bearing upon the wall of the ∧ slot 90. Now, when the handle is moved back, the carrying drum 95 will be rotated forwardly and its arm will strike the tail 93 of the setting plate, which, as just described, has been adjusted into line therewith, turning said plate in the arrow direction, Fig. 4ᵃ, resulting in first lifting the carrying pawl 89 to engage the carrying wheel of the next order because of the pin at 85 bearing upon the slot wall, and then resulting in sliding said pawl longitudinally by the action of the pin at 85 riding up the inclined wall of the said slot, thus turning the carrying wheel of the next order the distance of one tooth, the movement being limited and overthrow being prevented by the pin at 85 engaging the apex of the Λ shaped slot 90. This action also returns the adjusting link or arm 81 to its radial position with its projection 80 lifted into the path of the projection 79 on the carrying wheel 76, and the parts are thus left in neutral position, and with the tail piece 93 of the setting plate no longer in the path of the arms of the carrying drum. A spring detent 96 holds the carrying wheel in its moved position by frictionably engaging the same.

In subtracting, the carrying wheels rotate in a direction opposite to that of the arrow in Fig. 4, and precisely the same actions take place as those just described, excepting that the adjusting link or arm is tipped to the right instead of to the left in Fig. 4, and the pawl is set back instead of forward, so as to turn the carrying wheels the other way from that just described.

The V and Λ shaped slots are to provide for both addition and subtraction.

*Recording or printing mechanism.*—The carrying wheels 76 normally engage gears 96' of the printer, and rotation of these carrying wheels in either direction will cause one or the other of the pins 97 of the gears 96' to move the plate 98 belonging to that wheel, and through the pin and slot connection at 99$^x$ the corresponding setting disk 100 will be rotated through an angle corresponding to the number of teeth the carrying wheel has been rotated, and the setting disk will then be held by the detent 101, there being one of these for each setting disk. The setting disks operate, through links 102, the type segments 103 into position to print the numbers corresponding to the number of teeth through which the carrying wheels 76 have been rotated, there being one type segment for each numerical order, each segment having type from 1 to 9 inclusive. After the required digits have been set in line by the rotation of the type segments, the swinging printing frame, consisting of the side plates 68 and the cross connections or rods 104, and which printing frame carries all the setting gears 96', the plates 98, together with the type segments and intermediate connections, is rotated by rotating its carrying shaft 105 suitably journaled in the frame, said rotation being effected by a crank arm 106 on the rear shaft 32$^x$ and a slotted arm 107 on the printing frame shaft, and, as before stated, the rear shaft 32$^x$ can be rotated only on the backward movement of the handle 28. This swinging of the frame brings the type on the adjusted type segments to bear on the paper at the printing point A. When the printing frame swings forward to the position shown in Fig. 4, after the printing has been done, the type segments which have been operated are restored to zero position by the return bar 108 carried by arms 109 loosely mounted on the shaft 110 of the type segments, this return bar being operated by pins 111 on the hubs of the arms 109 being engaged by pins 112 on collars 113 pinned to the shaft of the type segments, the said shaft having an arm 114 fixed thereon which rides over a fixed pin 115 on the main stationary frame. The shaft of the type segments is under tension of a spring 116 connected at one end with an arm 117 fixed on the type segment shaft, which allows the arm 114 to slip past the fixed pin 115 as the printing frame swings rearwardly to print so that the arm may get on the other side of the pin for its effective action by said pin when the printing frame swings forwardly away from the printing point and the type segments are to be returned to normal position. In other words, the movement of the arm 114 by striking the pin performs no function as the printing frame swings rearwardly, but it effects the return of the type segments when the printing frame swings forwardly, and the arm 114 rides on the pin 115. When the type segments are returned to zero position the action of setting up is reversed and the plates 98 and gears 96' are also returned to their normal position.

In order to print zeros and print them only to the right of the significant number, the character 0 is carried on a separate block 118, one for each type segment, said blocks being pivoted to the segments at 119, so that normally the character 0 will not reach the paper, but will be depressed in respect to the characters on the type segment. Each block bears on a cam 120 loosely mounted on the type segment shaft 110. Now, if one of the type segments is set up to print any significant figure, it will revolve all of the zero cams lying to its right on the shaft of the type segments by means of the lugs 121, each of which overlaps the tail of the type segment at its left, and also the tail piece of the cam at its left, and these cams which lie to the right of the significant number, will raise the zero blocks 118 to make the zero type stand out as far as the type on the segments. The zero type lie in radial position in respect to the type segments to strike the printing point provided they are raised by the cams, but as they are carried by the type segments, they will be carried to a position below the printing point provided said segments at the right are set up or rotated as a result of operating the digit keys, and therefore even though the zero blocks are lifted into the circumferential plane of the type segments, this effect will be eliminated if components of the number to be printed are significant digits, i. e. any of those 1 to 9 requiring the type carriers to be turned. If, however, the number is 5000, the 5 key is operated, then the 0 key is operated three times. When the 5 key is operated, the selector mechanism is set to transfer this value to the printing mechanism, and as the 0 key is operated three times, the transmitting gear carriage is simply moved leftward three steps, the transmitting gears, however, being in such position that no value is transferred. When handle is operated to do the transferring, the fourth type segment from the right will be turned, and in doing so, it will cause the turning of the zero cams at its right and the lifting of the zero type to the printing circular plane of the type, and as these segments at the right have not been set up rotatively, the zero type will be in position to print, but if any of the segments at the right had been set up as a result of striking one of the significant figures, its zero block, although it were raised to the printing circuit, would be turned down from the printing point. The arrangement described enables me to position the zero type in radial position so that they can be printed without turning or setting up the segment carrying the one desired, but by simply lifting the zero block.

The carrying operation at the totalizer is performed after the swinging printing frame swings rearwardly toward the printing point and therefore after the printing gears 96' become disengaged from the carrying wheels so that in this way the setting up action will be kept distinct from the carrying action. That is to say, supposing the number 897 appears at the totalizer or register wheels and the keys of the digits 234 are pressed, these digits will be transferred to the type segments while the printing frame is forward and while the gears 96' mesh with the carrying gears, and of course these values will be thrown into the totalizer but the carrying will not be done until after the printing frame has swung rearwardly to print and has moved the gears 96' out of connection with the carrying gears which latter are then operated because the carrying drum is not rotated until the handle is about to complete its rearward movement.

When the printing frame swings forward the gears 96' are again thrown into mesh with the carrying gears ready to transfer values of the keys operated to the type segments or to transfer the movement of the totalizer wheels when these are returned to normal position, for setting up the totals on the type segments.

*Inking.*—The inking of the type segments is done by a roller 122 carried by arms 123 pivoted to the printing frame, and operated by a link 124 connected with the main frame, so that the roller will be moved up over the type at the printing point, and then down again out of the way.

*Paper feed.*—The paper to receive the impression passes over a roller 125 mounted in the main frame, a feed pawl 126 engaging a ratchet wheel on the paper roll shaft, which pawl is operated through a link 127 connected with an arm 128 pivoted on the main frame, which arm is operated from an arm 129 fixed on the rock shaft of the swinging printing frame through a pin and slot connection.

A correcting or alining bar 130 engages toothed tail pieces 131 of the type segments just before they reach the impression point, so that they will be accurately centered in relation to said printing point. This correcting bar is carried by a rock shaft 132 journaled in the swinging printing frame which is operated, as the frame swings, by arms 133 fixed on the shaft and links 134 connected with the arms and pivoted to the fixed frame.

*Totalizer.*—For transferring the totals which have accumulated on the register wheels to the printing mechanism, i. e., to set the type segments to correspond to the values set up on the register wheels so that these may be printed as a total, the following mechanism is provided: A totalizer key marked T is first pressed down, operating a bell crank lever 135, which, through a link 136 and bell crank lever 137, lifts a link 138 so that the notch 138' at the end of a slot 139 in the link, will engage a pin 140 on a lever 141 which is pivoted on the main frame, and is operated by a cam 142 on the front shaft 32 when the handle 28 is pulled forward. By thus depressing the totalizer key T, the link 138 will be locked to the lever 141 so that when the handle is pulled forward, the link will be moved rearwardly to swing the bail or resetting bar 143 rearwardly, which will therefore strike the projections or pins 79 on the gears 76, returning these gears to zero, and transferring the numbers set up on the register wheels through the gears 96', the setting disks 100 and the other connections before described to the type segments, thus setting them to print the number which has been accumulated on the register wheels, and this printing will take place when the printing frame is swung rearwardly by the rearward movement of the handle. Ordinarily, when the totalizer key remains up, the operation of the lever 141 due to the forward movement of the handle will be without effect, as its pin 140 will simply move in the slot of the link 138 and the transferring of the total will take place only when this link is lifted and thereby locked to the lever 141 by the depression of the T key and the consequent engagement of the locking notch of the link with the pin of the lever. The totalizer key, when pressed down, will be held together with the connections controlled thereby by a detent 144, until the printing frame swings back to do the printing, said detent being pivotally carried by the link 136 and engaging the pin 67 on the printing frame, so that while the handle is being drawn forward and the total transferred to the type segments by the return bar as above described, the connections will be held, but as soon as the handle is moved back to do the printing, the pin 67 will move away from the detent, and the totalizer key connections will be reset by a spring 146 connected with the frame and with the tail piece of the totalizer detent.

A lock is provided for the totalizer key to prevent its operation should any transmitting gears be in mesh with the selector, this being necessary to prevent a jam, because the movement of the transmitting gears would apply power to move the register segments in one direction while the return or totalizer bar would tend to move these register wheels in the opposite direction. This lock consists of a lever 164 pivoted on the shaft 2 of the selector having a notched end to engage a pin 165 on the stem of the totalizer key. It is held out of engagement when the transmitting gear carriage is at its normal position at the right of the selector, for at this time a projection 166 in the carriage presses down the rear end of this lever. But when the transmitting gear carriage is moved so that any of its gear segments is engaging the selector a spring 167 will cause the notched end of the stop lever to engage the pin on the total key stem and prevent its operation, until the transmitting gear carriage moves to the right to withdraw all of its gear segments from the selector.

It may be mentioned here that the numeral keys can not be operated except when the handle 28 is in its normal rearward position, because when said handle is drawn forward the shaft of the selector becomes locked to the link 37, and thus the operation of the numeral keys will be prevented.

*Subtraction and total signs.*—Means are provided for printing a minus sign opposite the subtrahend, consisting of a type segment 147 along side of the other segments, and bearing said minus sign. This segment is provided with a toothed tail piece 148 to be engaged by the correcting bar as in the manner above described, and this tail piece is connected by a link 149 with an arm 150 on the shaft 99 of the setting disks 100 before described, which arm 150 is connected with another arm 152 on the said shaft by a pin 152$^x$ which extends through an opening in the printing frame. This shaft 99 has an arm 153 fixed thereto, which is turned by a pin 154 on the link 62 when the subtractor key S is depressed so that the sign segment will be turned to print the minus alongside the number to be deducted or subtracted. After the printing is done, this sign segment will be restored, together with its connections, by the return bar as the handle is swung backwardly. The shaft 99 also has fixed thereto an arm 155 to be operated by a pin 156 on the link connected with the total key T so that when this key is depressed, the segment above mentioned which carries the total sign in addition to the minus sign will be turned to bring this total sign in line with the printing point, it being understood that this arm 155 stands at a different angle on the shaft from the angle of arm 153, so that the sign segment will be moved through a greater or lesser angle according as the subtracting or total key is operated.

I claim:—

1. In combination, a selector, a transmitting gear, a carriage, an escape rack on the carriage, a lever having movement vertically and horizontally, pawls carried by the lever for moving the rack step by step, keys with connections for operating the selector, a universal frame operated by the keys, said universal frame giving a vertical movement to the said lever for the escapement action, a hand lever for rotating the selector, and a cam operated from the hand lever for operating the escapement lever horizontally to shift the transmitting gears axially, substantially as described.

2. In combination, a selector, keys for setting the same, transmitting gears to engage the selector, totalizing wheels, a shaft with connections between the same and the selector, a carriage for the transmitting gears, a second shaft with connections for operating the carriage, a hand lever and gearing and clutches between said hand lever and the two shafts, said clutches operating one shaft on the forward stroke of the lever, and the other on the rearward stroke of the hand lever, substantially as described.

3. In combination, keys, a selector, transmitting gears to engage the selector, a hand lever, a slotted link and an arm on the selector shaft forming the connection between the hand lever and the selector shaft, said slot having a locking notch, the said selector being rotatable in either direction when the selector arm is engaging the slot, means holding the link with its slot in position to allow free movement to the arm, said means being controlled from the hand lever to allow the link by its locking notch to become locked to the arm for the operation of the selector from the hand lever.

4. In combination, a selector, transmitting gears to engage therewith, means for giving the selector rotary movement, an escapement carriage, a lever having pawls to control the escapement carriage, a cam and collar to act on the said lever to shift the same for moving the carriage to make the transmitting gears lie opposite the spaces between the totalizing wheels and a subtracting key with connections to the collar for moving the same circumferentially about the shaft and in relation to the cam to change the time of operation by said cam in relation to the movement of the selector for subtraction.

5. In combination, a selector, transmitting gears, a carriage therefor, keys, connections between the same and the selector, an escapement for the carriage connections thereto from the keys, a hand lever, a shaft geared to the hand lever to make the complete revolution as the hand lever is moved forward and to remain at rest as the hand lever is returned, connections between the shaft and the selector for rotating the same forward and backward for one revolution of the said shaft, means on said shaft for shifting the carriage of the transmitting gears a half space axially, a second shaft, with gearing and clutch between the same and the hand lever to be operated thereby on its return stroke only, accumulator and printing mechanism with means for operating the same from said second shaft, and means for operating the carriage of the transmitting gears from said second shaft, substantially as described.

6. In combination a selector, transmitting gears, key operated means for setting the selector in different positions, transmitting gears, a carriage therefor, escapement for the carriage, means operated from the keys for controlling the escapement, accumulator means with which the transmitting gears engage, means for shifting the transmitting gears axially for subtraction, a subtracting key with connections for controlling the shifting means, a detent for holding the subtracting key connections in operated position, printing mechanism, a swinging frame for the accumulator means and the printing mechanism, means for swinging the frame, said frame controlling the said detent, substantially as described.

7. In combination a selector, transmitting gears to engage therewith, a carriage for the transmitting gears, an escapement for the carriage, keys, connections therefrom to the selector and escapement means, a hand lever, connections controlled thereby for rotating the selector and shifting the carriage of the transmitting gears, printing mechanism including a swinging frame with means for operating the same from the handle, a multiplying key with connections for rendering the carriage shifting connections ineffective, and a detent for holding the said key and its connections, said detent being controlled by the swinging frame to release the detent, substantially as described.

8. In combination carrying wheels having projections, carrying pawls, setting plates for setting and operating the pawls, means for operating the setting plates, and adjusting arms one for each pawl and setting plate, arranged to be struck by the projections of the carrying wheels, and to drop away from the carrying wheel and its projection when operated, said arm or link controlling the setting plate, substantially as described.

9. In combination, carrying wheels having projections, carrying pawls, setting plates for operating the pawls, means for operating the setting plates, adjusting arms one for each pawl and setting plate, arranged to be struck by the projections on the carrying wheel, said adjusting arms occupying normally a neutral radial position to be tipped in either direction by the projections on the carrying wheels and thus cause the setting of the pawl for addition and multiplication or subtraction.

10. In combination, carrying wheels having projections, carrying pawls to engage said wheels, setting plates for operating the pawls, said pawls having movement in relation to the plates, adjusting arms having a rocking and a radial movement and arranged to be tipped by the projections on the carrying wheels, said pawls and adjusting arms having pin and slot connections with the setting plates, and said adjusting arms moving bodily away from the carrying wheel when tipped, substantially as described.

11. In combination, carrying wheels having projections, carrying pawls having pivotal and bodily movement, setting plates, means for operating the setting plates, adjusting arms arranged to be struck and moved by the projections on the carrying wheels, the said pawls and adjusting arms having slots therein of straight and Λ shape receiving a pin from the setting plate, said arms occupying central or neutral positions normally with the pin at the apex of the Λ and movable bodily away from the carrying wheels when tipped in either direction, substantially as described.

12. In combination, carrying wheels having projections, carrying pawls having pivotal and bodily movement, setting plates, means for operating the setting plates, adjusting arms arranged to be struck and moved by the projections on the carrying wheels, the said pawls and adjusting arms having slots therein of straight and Λ shape receiving a pin from the setting plate, said arms occupying central or neutral positions normally with the pin at the apex of the Λ and movable bodily away from the carrying wheels when tipped in either direction, the said setting plates being pivotally mounted and spring pressed, substantially as described.

13. In combination carrying wheels having projections, carrying pawls having pivotal and bodily movement, setting plates, means for operating the setting plates, adjusting arms arranged to be struck and moved by the projections on the carrying wheels, the said pawls and adjusting arms having slots therein of straight and Λ shape receiving a pin from the setting plate, said arms occupying central or neutral positions normally with the pin at the apex of the Λ and movable bodily away from the carrying wheels when tipped in either direction, said adjusting plates having each a V shaped slot engaging a pin on the frame, substantially as described.

14. In combination, carrying wheels, gears meshing therewith, printing segments having type, operating mechanism between the said gears and the printing segments, and a movable printing frame carrying said gears and type segments with the intermediate operating mechanism, impression means and means for moving the said frame, substantially as described.

15. In combination, carrying wheels, gears meshing therewith, type segments, connections between the said gears and type segments, said carrying wheels and gears being rotatable in one direction for addition and the other direction for subtraction, means for operating the carrying wheels and means for operating said connections from said gears when rotated in either direction.

16. In combination, carrying wheels, gears meshing therewith, type segments, connections between the said gears and type segments, said carrying wheels and gears being rotatable in one direction for addition and the other direction for subtraction, means for operating the carrying wheels, and means for operating said connections from said gears when rotated in either direction, said connections including the sliding bars and the pivoted setting members connected therewith, and means connecting the setting members with the type segments.

17. In combination, a series of segments having number type on their periphery, means for operating the segments to bring the desired number to the printing point, carriers for the 0 type movably mounted on the segments and holding the 0 type depressed in respect to the significant type and normally opposite the printing point, and means for moving the carriers to lift the 0 type even with the significant type, said means being operated by the type segments and affecting those 0 type lying to the right of the significant number, and consisting of the cams on the shaft of the segments with means for operating them from the type segments.

18. In combination, the type segments, the blocks pivotally mounted thereon and having 0 type normally depressed below the periphery of the segments, but normally opposite the printing point, cams on the shaft of the segments for operating the pivoted blocks, and means for operating the cams, substantially as described.

19. In apparatus of the class described, totalizing mechanism comprising register wheels and carrying gears, type carriers, a movable printing frame on which the type carriers are mounted, gears meshing with the totalizing mechanism and mounted on the movable printing frame, and detachable from the said totalizing mechanism on the movement of the frame for printing, and means for effecting the carrying operation onto the register wheels after the printing frame has moved and disengaged its gears from the totalizing mechanism, substantially as described.

20. In apparatus of the class described, totalizing mechanism comprising register wheels and carrying gears, type carriers, a movable printing frame on which the type carriers are mounted, gears meshing with the totalizing mechanism and mounted on the movable printing frame, and detachable from the said totalizing mechanism on the movement of the frame for printing, and means for effecting the carrying operation onto the register wheels after the printing frame has moved and disengaged its gears from the totalizing mechanism, means for returning the register wheels to normal position, thereby through the engaged printing frame gears to set up the totals on the type segments, substantially as described.

21. In combination, totalizer mechanism comprising register wheels, carrying wheels having projections, carrying mechanism for operating the carrying wheels, including carrying pawls and setting mechanism therefor operated by the said projections, type carriers, a movable printing frame carrying the type segments, gears on the printing frame engaging the totalizing mechanism and connected with the type carriers for operating them, means acting on the projections of the carrying wheels for operating them to clear the register wheels, while the gears of the printing frame are engaged, means for swinging the printing frame to print and thereby disengage the gears on the printing frame, and means for operating the carrying mechanism when the gears are disengaged, substantially as described.

22. In combination, totalizer mechanism comprising register wheels, carrying wheels, type carriers, a printing frame movably mounted and carrying the type carriers, gears on the printing frame to mesh with the totalizer mechanism, connections between said gears and the type carriers, means normally ineffective for resetting the register wheels, a totalizer key with connections for rendering the resetting mechanism effective, means for shifting the printing frame, and means for operating the carrying wheels to carry when the printing frame is shifted, substantially as described.

23. In combination, totalizer mechanism comprising register wheels, carrying wheels, type carriers, a printing frame movably mounted and carrying the type carriers, gears on the printing frame to mesh with the totalizer mechanism, connections between said gears and the type carriers, means normally ineffective for resetting the register wheels, a totalizer key with connections for rendering the resetting mechanism effective, means for shifting the printing frame, and means for operating the carrying wheels to carry when the printing frame is shifted, said resetting means including a lever, a cam for operating the same and a handle for operating the cam, and said connections including a slotted link in connection with which said lever works idly, and a device for connecting the said link with the lever when the totalizer key is operated, substantially as described.

24. In combination, totalizer mechanism, type carriers, a printing frame carrying the same and movably mounted, connections on the printing frame to engage and disengage the totalizer mechanism for operating the type carriers, means for shifting the printing frame to make the impression and means for giving the totalizer a carrying action when the printing frame is moved and the connections disengaged, substantially as described.

25. In combination, totalizer mechanism, type carriers, a printing frame carrying the same and movably mounted, connections on the printing frame to engage and disengage the totalizer mechanism for operating the type carriers, means for shifting the printing frame to make the impression and means for giving the totalizer a carrying action when the printing frame is moved and the connections disengaged, and means for returning the totalizer mechanism to normal position when the printing frame is moved with its connections engaged by the totalizer to thereby transfer the total onto the type carriers, substantially as described.

26. In combination, totalizer mechanism, type carriers, a printing frame carrying the same and movably mounted, connections on the printing frame to engage and disengage the totalizer mechanism for operating the type carriers, means for shifting the printing frame to make the impression and means for giving the totalizer a carrying action when the printing frame is moved and the connections disengaged, and means for returning the totalizer mechanism to normal position when the printing frame is moved with its connections engaged by the totalizer to thereby transfer the total onto the type carriers, a totalizer key for controlling the said returning means, a detent for holding said key in its controlling position, said detent being in turn controlled by the movement of the printing frame, substantially as described.

27. In combination, totalizer mechanism, a selector, transmitting gears to be engaged thereby, said transmitting gears engaging also the totalizer mechanism, a carriage for the transmitting gears, means for returning the totalizer to normal position, a totalizer key to control said return mechanism, and a lock for said key controlled from the carriage of the transmitting gears, substantially as described.

28. In combination, totalizer mechanism, type carriers, a shiftable printing frame carrying the type carriers, connections on the shifting frame for operating the type carriers, from the totalizer mechanism, means for shifting the printing frame to make the impression, a return bar for the type carriers and means engaging a fixed frame part for operating the return bar when the printing frame moves back to normal position, substantially as described.

29. In apparatus of the class described, totalizing mechanism comprising register wheels and carrying gears, type carriers, a shifting printing frame on which the type carriers are mounted to be moved to the printing point, connections mounted on the printing frame for connecting the totalizing mechanism with the type carriers, said connections being detachable from the totalizing mechanism on the movement of the said frame for printing, an operating handle, connections between the same and the printing frame for moving it to print, and connections between the said handle and the carrying gears for operating the same for carrying after the printing frame has been moved to effect the impression, substantially as described.

30. In combination in apparatus of the class described, totalizing mechanism comprising register wheels and carrying gears, type carriers, a movable printing frame on which the type carriers are mounted, connections mounted on the printing frame for operating the type carriers from the totalizing mechanism, said connections being detachable from the said totalizing mechanism when the printing frame is moved for making the impressions, resetting mechanism for the totalizing mechanism, a totalizer key for throwing the resetting mechanism into operable condition, an operating handle, connections between the same and the swinging printing frame to operate the latter, and connections between the operating handle and the totalizer resetting mechanism to reset the totalizer and set up the total on the type carriers when the totalizer key is operated, substantially as described.

31. In combination, type segments, members carrying 0 type and movably mounted, and cams for moving the said members to position the 0 type for printing, said cams forming a backing for the said members to sustain the thrust of the impression, substantially as described.

In testimony whereof, I affix my signature in presence of two witnesses.

SYDNEY B. AUSTIN.

Witnesses:
BENTON M. STAHL,
BENNETT S. JONES.